(12) United States Patent
Selman et al.

(10) Patent No.: US 8,979,361 B2
(45) Date of Patent: Mar. 17, 2015

(54) TIME-TEMPERATURE DOSIMETER

(75) Inventors: Corey M. Selman, West Hills, CA (US); Uma Sampathkumaran, Torrance, CA (US)

(73) Assignee: InnoSense LLC, Torrance, CA (US)

( * ) Notice: Subject to any disclaimer, the term of this patent is extended or adjusted under 35 U.S.C. 154(b) by 13 days.

(21) Appl. No.: 13/460,586

(22) Filed: Apr. 30, 2012

(65) Prior Publication Data

US 2013/0287059 A1 Oct. 31, 2013

(51) Int. Cl.
*G01K 3/00* (2006.01)
*G01K 1/00* (2006.01)

(52) U.S. Cl.
USPC ............................. 374/104; 374/106; 116/219

(58) Field of Classification Search
CPC ......... G01K 3/04; G01K 11/06; G01K 13/00; G01K 1/14
USPC ...................................... 436/58; 116/216, 219
See application file for complete search history.

(56) References Cited

U.S. PATENT DOCUMENTS

| | | | | |
|---|---|---|---|---|
| 3,420,205 A * | 1/1969 | Morison | ......................... | 116/200 |
| 3,954,011 A * | 5/1976 | Manske | ......................... | 374/102 |
| 4,362,645 A * | 12/1982 | Hof et al. | .................... | 252/408.1 |
| 5,120,137 A * | 6/1992 | Ou-Yang | ........................ | 374/106 |
| 5,368,905 A * | 11/1994 | Ohno | ............................ | 428/34.1 |
| 5,597,238 A * | 1/1997 | Colley et al. | ................... | 374/106 |
| 6,042,264 A * | 3/2000 | Prusik et al. | ................... | 374/106 |
| 6,916,116 B2 * | 7/2005 | Diekmann et al. | ............. | 374/102 |
| 7,476,874 B2 * | 1/2009 | Patel | ........................... | 250/484.5 |
| 7,517,146 B2 * | 4/2009 | Smith et al. | ..................... | 374/162 |
| 8,253,321 B2 * | 8/2012 | Naum et al. | ................... | 313/503 |
| 2007/0245947 A1 * | 10/2007 | Riemelmoser | ................ | 116/217 |
| 2008/0121815 A1 * | 5/2008 | Agrawal et al. | ............. | 250/473.1 |

* cited by examiner

*Primary Examiner* — Lisa Caputo
*Assistant Examiner* — Nasir U Ahmed
(74) *Attorney, Agent, or Firm* — Mandour & Associates, APC

(57) ABSTRACT

The present disclosure relates to a dosimeter for measuring exposure to heat over time in combination with peak temperature indicators and reversible temperature indicators. The preferred temperature indicator tag is credit card sized and comprises four time-temperature dosimeters. Each dosimeter has a wick in contact with a separate reservoir containing a mix of a colored dye, a wax and an amorphous polymer to indicate a distinct temperature range when the mix melts. The wicks are preferably made of porous paper with a pore size around 8 microns to allow for proper capillary action along its length. An adhesive, except where each wick contacts its respective reservoir and at a vent, preferably seals each wick. The tag preferably has a plurality of peak temperature indicators where each indicator has a blend of a dye, a wax and a polymer for a temperature indication range. The tag also preferably has a plurality of reversible temperature sensors.

6 Claims, 3 Drawing Sheets

TIME-TEMPERATURE DOSIMETER

This invention was made with government support under (W15QKN-09-C-0153) awarded by U.S. Army JML Contracting Center. The government has certain rights in the invention.

FIELD

The present disclosure relates to a dosimeter for measuring time-temperature exposure in combination with peak temperature indicators and reversible temperature indicators.

BACKGROUND

A number of different types of time-temperature and heat detection devices exist. However, these devices are often not able to effectively measure the total time of exposure to predetermined temperature levels; have limited product life spans; and/or have temperature ranges that are too limited for particular applications. Accordingly, a device is needed that can more effectively measure exposure to temperature over time, over an extended product life span and with a greater temperature range.

SUMMARY OF THE INVENTION

The present disclosure relates to a dosimeter for measuring exposure to heat over time in combination with peak temperature indicators and reversible temperature indicators. The preferred temperature indicator tag is credit card sized and comprises four time-temperature dosimeters. Each dosimeter has a wick in contact with a separate reservoir containing a mix of a colored dye, a wax and an amorphous polymer to indicate a distinct temperature range when the mix melts. The wicks are preferably made of porous paper with a pore size around 8 microns to allow for proper capillary action along its length. An adhesive, except where each wick contacts its respective reservoir and at a vent, preferably seals each wick. The tag preferably has a plurality of peak temperature indicators where each indicator has a blend of a dye, a wax and a polymer for a temperature indication range. The tag also preferably has a plurality of reversible temperature sensors.

BRIEF DESCRIPTION OF THE DRAWINGS

The present invention described herein will become apparent from the following detailed description considered in connection with the accompanying drawings, which disclose several embodiments of the invention. It should be understood, however, that the drawings are designed for the purpose of illustration and not as limits of the invention.

DETAILED DESCRIPTION OF PREFERRED EMBODIMENTS

Figure 1:
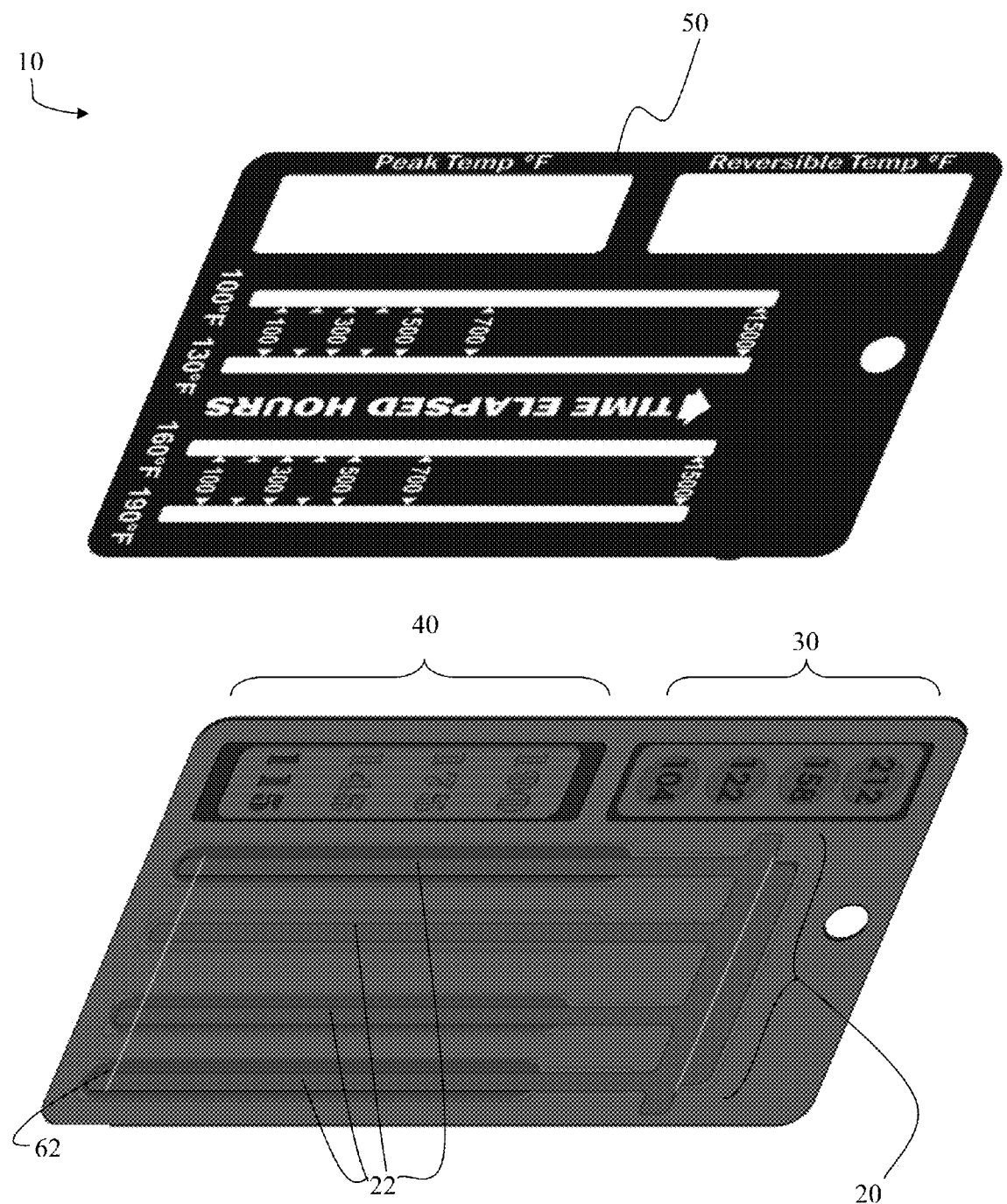
FIG. 1 is a front perspective view of a preferred embodiment of the invention.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident however, that such embodiment(s) may be practiced without these specific details.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Referring now to FIG. 1, a perspective front view of a preferred embodiment of the invention 10 is shown. The embodiment shown in FIG. 1 is a temperature indicator tag 10, preferably credit card-sized, with a set of four time-temperature dosimeters 20, a set of four reversible temperature sensors 30, and a set of four peak temperature indicators 40. The reversible temperature sensors 30 preferably comprise liquid crystal temperature indicators such as those made by TMC Hallcrest. The dosimeters 20 are preferably configured to indicate a time-temperature indication period of 500 hours at 160 degrees Fahrenheit or more. Each dosimeter 20 preferably has a wick 22 below a transparent plastic film 50. Each wick 22 is preferably, approximately 2 inches in length. The preferred wick medium is paper, e.g. Whatman 2, having a pore size of approximately 8 microns. However, a range of 2-30 microns is usable. Furthermore, other porous wick media that can withstand heat-sealing temperatures such as glass fiber paper may be used.

It should be noted that "wicking" starts fast and slows as wicked substance proceeds along a generally constant width and depth wick. The rate of slowing can be modulated by tapering the wick in the direction of travel. For a larger taper, a lower rate of slowing can be achieved. A decreasing non-linear wick taper such as an exponential or power curve shape may result in a more linear wicking rate over time compared to a linearly decreasing taper. Conversely, a wick that tapers such that it increases in size in the direction of travel can slow the rate of wicking over that of a non-dimensionally changing wick. For the present invention, the wicks 22 could be untapered. However, preferably the wicks 22 start out ⅛" wide with a 5:1 taper that provides an end point of 0.025". A larger taper would likely be more difficult to see if it narrowed to a width less than 0.025". Preferably, a tapered wick would be no smaller than 0.025" at the taper end. If the wick 22 started with a wider end, it would allow larger tapers that can be more easily visualized for ease of use and readability.

Figure 2:
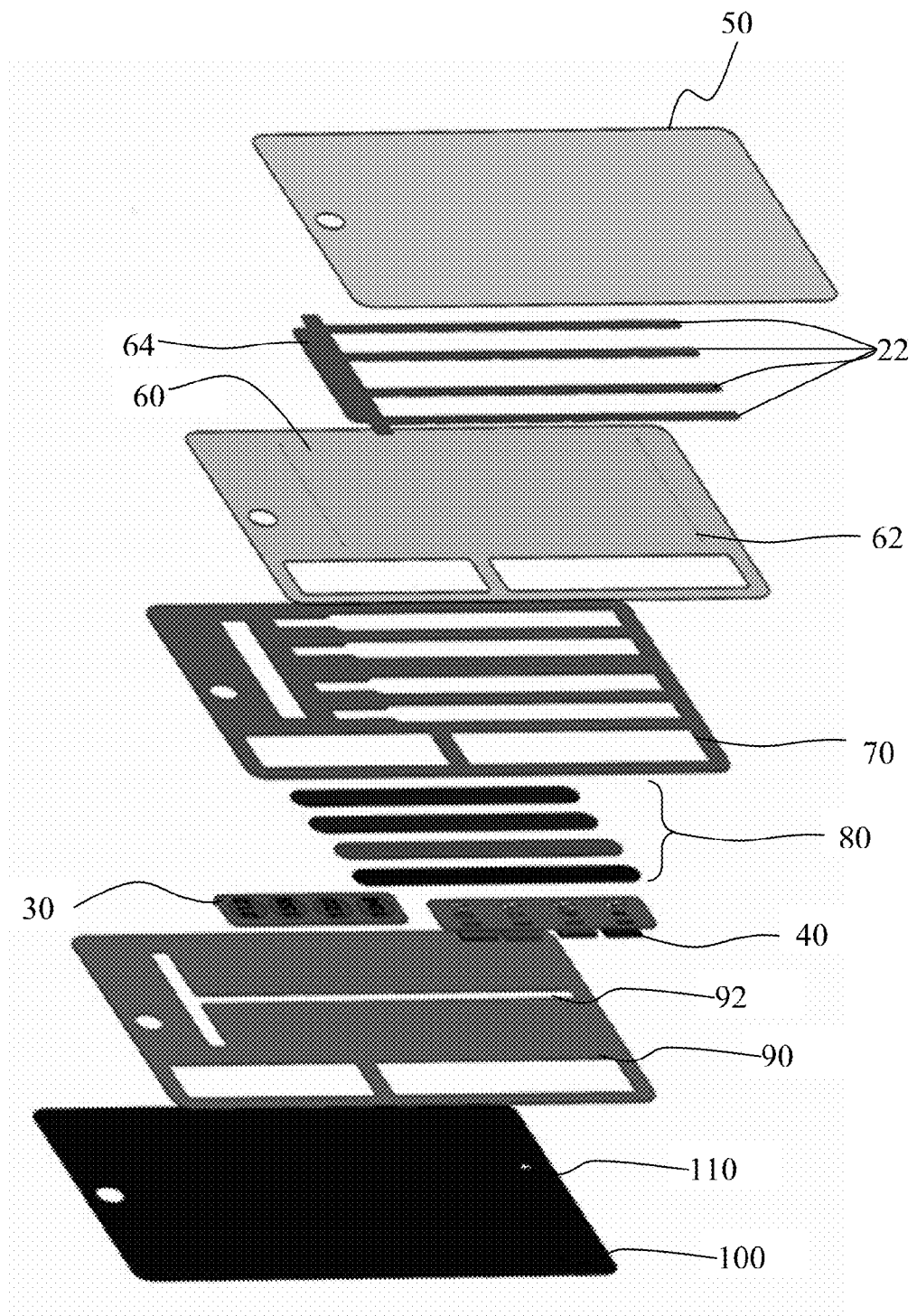
FIG. 2 is an exploded perspective view of a preferred embodiment of the invention; and, FIG. 3 is an exploded perspective view of a preferred embodiment of a peak temperature indicator.

Referring now to FIG. 2, a perspective exploded view of a temperature indicator tag 10 is shown. A transparent or clear film 50 covers a front side of the set of four wicks 22 for the time-temperature dosimeter shown. A time-temperature scale can be printed on plate 50 as shown in FIG. 1. The film or plate 50 is preferably thermoplastic polycarbonate. An opaque film or plate 60 covers the back side of the wicks 22. The plate 60 is also preferably thermoplastic polycarbonate.

As shown in FIG. 2, there is preferably a set of four reservoirs 80 where each reservoir preferably contains a blend of a crystalline melting material such as wax, a polymer and a colored dye. The waxes used are narrow melting range paraffin waxes known as thermostat waxes as they are typically used for this industrial application. A typical formula would be 39.75% HA-20 (a 100° F. melting wax from IGI International), 60% Oppanol® B 10 SFN (a 40,000 MW polyisobutylene resin from BASF), and 0.25% Blue R3 (a solvent dye from ColorChem International). Below is a table of preferred wax-polymer-dye blends for use in the dosimeters:

| 100 MP TT Blend | 60% B10 BASF polymer | 39.75% HA20 IGI wax | 0.25% Blue R3 ColorChem |
|---|---|---|---|
| 130 MP TT Blend | 65% B10 BASF polymer | 34.75% HA26 IGI wax | 0.25% Green B5 ColorChem |
| 160 MP TT Blend | 67% B10 BASF polymer | 32.75% 150 model IGI wax | 0.25% Violet BV ColorChem |
| 190 MP TT Blend | 70% B10 BASF polymer | 29.75% 180 model IGI wax | 0.25% Red PS ColorChem |

The wax-polymer-dye mixes/blends are preferably mixed together by high shear mixing and elevated temperature heating, e.g. 50-100 degrees Fahrenheit above the melting point of the wax used in the blend, to form a single blended mixture that does not separate. The mixture is preferably then filtered to remove non-blended polymer gels. It should be noted that even a small amount of polymer gel could preferentially attach to wicking media and slow the wicking rate of the polymer-wax-dye blend. The mix operates such that when the wax is below its melting point, it is a solid that locks the extremely high viscosity liquid polymer, e.g. polyisobutylene, from moving. When the blended wax melts the polymer resin flows and wicking can proceed along the length of the wick via capillary action thus indicating a particular time-temperature dose. Alternative low crystallinity polymers such as amorphous polypropylene or amorphous polyolefins may also be used. Ultra low crystallinity polymers used for slowing wicking rates are preferred. They allow formulation of blends that flow when the crystalline non polymer melts. A typical formula is a low molecular weight amorphous polymer 60-70%, wax 30-39.75%, and dye 0.25%. The mixture melting point is determined by the melting point of the wax that is selected. Mixture ratios are chosen for their viscosity that determines travel within a fixed wick path length of 1-3 inches over a 1000-hour time frame.

The bonding of the layers is an integral component of the invention as failure in the bonding of the layers could cause a failure in the time-temperature wicking rate. The most critical bond is the bond between the wicks 22 and the clear film 50 and the opaque film 60. The wicks 22 need to be sealed without gaps (except for the contact points 62 with reservoirs 80 and the vent 64 at the end of the wick 22 opposite the reservoir 80) in order that wicking may proceed in a measured rate. An improper gap can cause wicking to occur at a faster rate than is intended. The improper gap can also cause excess material to collect in such a gap. A sealing adhesive is needed to seal the wicks 22 and to adhere the films 50, 60, 70 and 90 together. However, it is preferable that the sealing adhesive not penetrate the wicks 22 more than superficially so that the wicking pores are not clogged and interfere with the flow of the blends along the wicks 22. A sealing adhesive for the purpose of this invention is a plastic whose heat deflection temperature is above the invention's intended use temperature but below higher temperature backing film.

In addition, the sealing adhesive preferably thermally deforms around the wick 22 edges so as not to allow a void to form on the wick 22. During heat-sealing, plastics soften and flow. Accordingly, during heat-sealing, the clear film 50, the wicks 22 and opaque film 60 can be fitted into a mold to prevent dimensional changes from occurring during the heat sealing process. The reservoir plate 70 contains internal features and preferably should have a mold with male internal projections corresponding to the internal cut outs during heat sealing. For high-speed lamination, a mold-less process is preferred. To reduce the incidence of dimensional shift during heat-sealing of the plastic films 50, 60, 70 and 90, it is preferable that a lower temperature melting adhesive plastic film, such as polycarbonate-polyester alloy, is laminated to a higher temperature melting plastic film, such as polycarbonate.

Preferably, the sealing adhesive should not penetrate the wicks 22 more than superficially during heat sealing or during elevated temperature usage of the invention. The sealing adhesive preferably does not chemically interact with the mixes in the reservoir 80 as this might reduce the adhesive bonding between the device components. The sealing adhesive preferably has a heat deflection temperature greater than the use temperature of the device 10 to maintain bonding strength. The sealing adhesive's crystalline melting temperature is preferably greater than the heat-sealing temperature in order that the wicks 22 not be completely penetrated. The preferred adhesive film is polycarbonate blended with a low crystallinity thermoplastic polyester.

The reservoir plate 70 is preferably heat sealed to the back of the opaque film 60. The reservoirs 80, e.g. paper/sponges containing the preferred wax-polymer-dye blends, are placed in the reservoir plate 70. The vent plate 90 preferably provides pressure venting for the wicks 22 via the vent channel 92 aligned with vent 64 on the opaque film 60. The vent plate 90 is sealed to the back of the reservoir plate 70. In turn, the vent channel 92 on plate 90 is aligned with the vent hole 110 on the back plate 100. Thus, the vent 64, vent channel 92 and vent hole 110 work in combination to vent pressure between the reservoirs 80 and wicking media 22 and the environment. The peak temperature indicators 40 and current temperature indicators 30 are placed into the reservoir plate 70. The back plate 100 is preferably sealed to the back of the vent plate 90 using pressure sensitive adhesive, e.g. 3M 467. During heat sealing, the clear/transparent film 50, the wicks 22 and the opaque film 60 are heated to around 300° F. and are compressed together with a force between 100 and 1000 psi to cause the plastic to soften and allow bonding to occur. The plastic of the films 50 and 60 and the sealing adhesive mold around the wicks 22 so that negligible gaps are present (except where the wicks contact the reservoirs 80, namely the reservoir contact point 62). Small gaps in the sealing adhesive on the wicks 22 of a few thousandths of an inch or greater could cause internal flooding which would affect the accuracy of the device 10.

Each reservoir 80 is preferably vented to relieve positive and negative pressure that would occur if the reservoirs 80 were sealed and the ambient pressure/pressure exterior to the device 10 rose or fell. Additionally, during use when the wax-polymer mixture in the reservoirs 80 melt, the wax undergoes an expansion that can tend to pressurize the reservoirs 80. The time-temperature device accuracy is improved when there are only small pressure effects to cause the wicking rate to either speed up during a pressure rise in the reservoirs 80 and likewise to slow down during a pressure fall in the reservoirs 80. The pressure effects are changes relative to the external or ambient pressure, in essence the gauge pressure that takes into account absolute pressure and adds or subtracts from this pressure. For optimal device function, the reservoir gauge pressure should be zero. If the device 10 were placed in a vacuum, it could still function correctly as the external surface of the device pressure should still be the same as the internal reservoir pressure. Blockage of one or more of the reservoirs 80 when the wax-polymer-dye mixture melts would result in pressure in the reservoir being higher than the outside environment.

Figure 3:
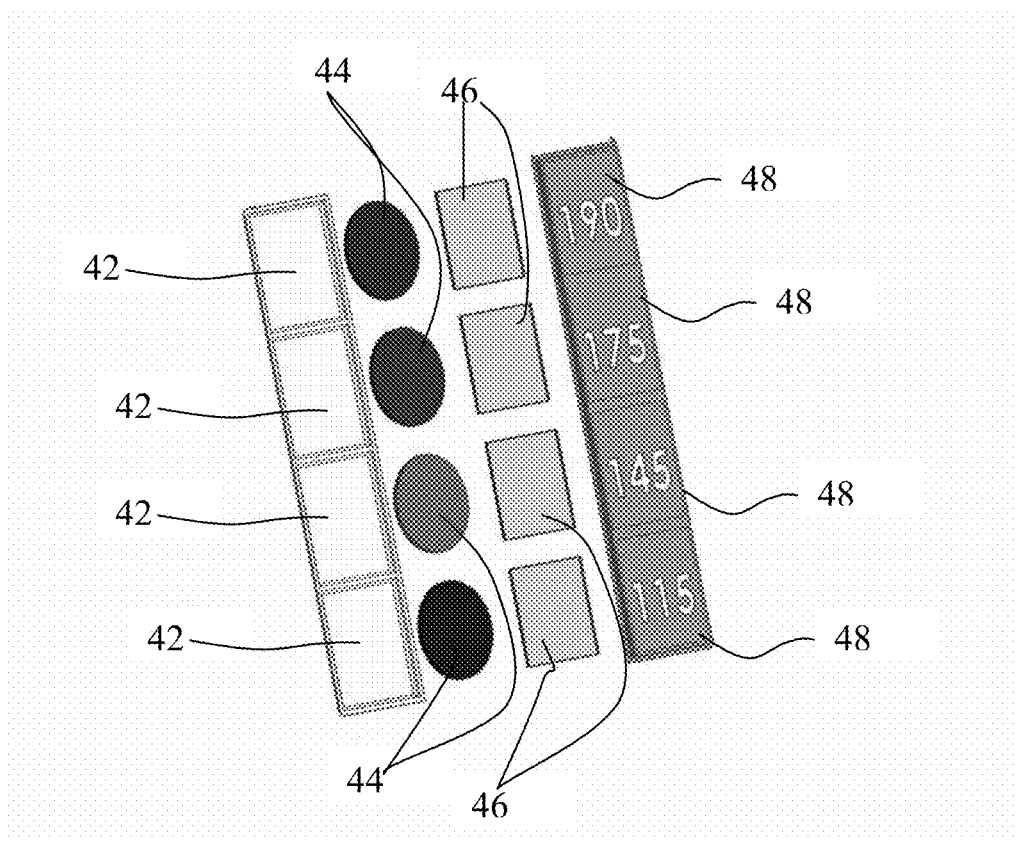

Referring now to FIG. 3, a preferred embodiment of a set of four peak temperature indicators 40 is shown. Reference number 44 refers to a sponge/paper such as the reservoirs 80 shown in FIG. 2—preferably a Whatman paper having porosity between 2 and 30 microns. The peak temperature indicators 40 preferably each comprise a reservoir chamber 42 and a peak reservoir 44 containing a mix of a wax, polymer and dye below an opaque white porous wick 46 and a peak temperature indicator number 48, preferably a reverse white printed number corresponding to the peak temperature to be indicated. The top layer of the peak temperature indicators 40 are preferably white reverse printed numbers 48 on clear plastic. The wicks 46 are preferably white paper squares placed below the numbers where the color of the wicks 46 match the white color of the plastic numbers 48. When assembled the reverse printed numbers 48 are less readily visible. When each colored wax-dye mixture 46 reaches its predetermined melting point, the colored circle mixture 44 migrates to the adjacent white square 46 by capillary flow and the reverse white printed numbers 48 become easy to read as the white paper 46 becomes colored. A critical aspect of the peak temperature indicators is they should react fairly quickly when the corresponding predetermined peak temperature has been reached. The colored-wax mixes in reservoir 44 melts and it is absorbed into the porous paper 46 to reveal the reverse pre-printed number corresponding to the peak temperature of interest. A small amount of polymer may be added to the wax to slow the action. Alternatively one could substitute a stencil cut number on a white plastic above the white paper to show the same effect as the reverse white number on clear plastic. The preferred mixes stored in reservoirs 44 for the peak temperature indicators 40 are a 94.75-99.75% wax 0-5% polymer, 0.25% dye mix. The following table shows a preferred set of wax-polymer-dye mixes for use in peak temperature indicators:

| | | | |
|---|---|---|---|
| 115 MP Peak Blend | 5% B10 BASF polymer | 94.75% 2202A IGI wax | 0.25% Blue R3 ColorChem |
| 145 MP Peak Blend | 5% B10 BASF polymer | 94.75% Astorstat 10037 IGI wax | 0.25% Green B5 ColorChem |
| 175 MP Peak Blend | 5% B10 BASF polymer | 94.75% 174/175 IGI wax | 0.25% Violet BV ColorChem |
| 190 MP Peak Blend | 5% B10 BASF polymer | 94.75% 180 model IGI wax | 0.25% Red PS ColorChem |

Each reservoir chamber 42 containing the wick 46 and reservoir 44 with mix can be sealed in thin clear plastic bags with separate compartments to keep the colors from different reservoir chambers 42 from mixing.

Accordingly, the present invention can be used in a wide variety of applications such as food or medicine preservation or chemical monitoring, e.g. monitoring whether a particular substance has exceed a predetermined temperature for a predetermined period of time. Given that wicking in the present invention can be kept to slow speeds or even stopped and started again, monitoring times up to 500 hours and up after a period of ten years are possible.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether flow control or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A temperature indicator tag comprising:
   a time-temperature dosimeter having a plurality of wicks; each wick in contact with a separate reservoir containing a mix of a colored dye, a wax and an amorphous polymer; whereby each reservoir, mix and wick are used to indicate a distinct temperature range and each wick is sealed by an adhesive except where each wick contacts its respective reservoir;
   a plurality of peak temperature indicators; each indicator having a blend of a dye, a wax and a polymer where the blend has a temperature indication range and where the blend is in contact with an opaque porous wick and viewable through a transparent temperature indicator; and,
   a plurality of reversible temperature sensors.

2. The temperature indicator tag of claim 1 where the temperature range for the dosimeter is 10 to 300 degrees Fahrenheit.

3. The temperature indicator tag of claim 1 where the peak temperature indicator can indicate a temperature of 10 to 300 degrees Fahrenheit.

4. The temperature indicator tag of claim 1 where the time-temperature dosimeter further comprises a reservoir vent to regulate pressure between the reservoir and a pressure external to the reservoir.

5. The temperature indicator tag of claim 1 where the adhesive is a mix of polycarbonate and thermoplastic polyester.

6. The temperature indicator tag of claim 1 where the plurality of wicks each have a length and are tapered along the length.

* * * * *